(12) United States Patent
Reissmann

(10) Patent No.: US 11,224,174 B2
(45) Date of Patent: Jan. 18, 2022

(54) PLANT WATERING DEVICE

(71) Applicant: Lutz W. Reissmann, Statesville, NC (US)

(72) Inventor: Lutz W. Reissmann, Statesville, NC (US)

(*) Notice: Subject to any disclaimer, the term of this patent is extended or adjusted under 35 U.S.C. 154(b) by 479 days.

(21) Appl. No.: 16/431,725

(22) Filed: Jun. 4, 2019

(65) Prior Publication Data

US 2019/0283229 A1    Sep. 19, 2019

Related U.S. Application Data

(63) Continuation-in-part of application No. 15/896,056, filed on Feb. 13, 2018, now abandoned, and a continuation of application No. 14/809,172, filed on Jul. 25, 2015, now abandoned.

(51) Int. Cl.
| | |
|---|---|
| *A01G 29/00* | (2006.01) |
| *B25F 1/02* | (2006.01) |
| *A01B 1/20* | (2006.01) |
| *A01G 25/14* | (2006.01) |
| *A01B 1/22* | (2006.01) |
| *B25G 3/26* | (2006.01) |
| *B25G 3/30* | (2006.01) |

(52) U.S. Cl.
CPC .............. *A01G 29/00* (2013.01); *A01B 1/20* (2013.01); *A01B 1/227* (2013.01); *A01G 25/14* (2013.01); *B25F 1/02* (2013.01); *B25G 3/26* (2013.01); *B25G 3/30* (2013.01)

(58) Field of Classification Search
CPC ...................................... A01G 29/00
See application file for complete search history.

(56) References Cited

U.S. PATENT DOCUMENTS

| | | | |
|---|---|---|---|
| 708,126 A | 9/1902 | Chase | |
| 1,424,157 A * | 8/1922 | Cook | A01G 29/00 47/48.5 |
| 1,449,606 A * | 3/1923 | Horner, Jr. | A01N 59/20 424/637 |
| 1,601,778 A * | 10/1926 | Stauffer | A01G 29/00 111/7.1 |
| 2,018,003 A * | 10/1935 | Axtell | A01G 29/00 111/7.1 |
| 2,502,368 A | 3/1950 | Carlson | |
| 2,850,992 A | 9/1958 | Hooper et al. | |
| 4,170,948 A | 10/1979 | Strickland, Jr. | |
| 4,697,952 A * | 10/1987 | Maddock | A01G 25/06 405/36 |
| 4,999,057 A | 3/1991 | Peterson | |
| 5,398,445 A | 3/1995 | Lemons | |
| 5,605,010 A | 2/1997 | Furlong et al. | |
| 6,082,795 A | 7/2000 | Fornelli | |

(Continued)

*Primary Examiner* — Jessica B Wong
(74) *Attorney, Agent, or Firm* — Memminger E. Wiggins

(57) ABSTRACT

A plant watering device designed and configured to efficiently provide water to either potted plants or to in-ground garden plants. The plant watering device having a hollow elongated cylindrical member and at least one series of linearly aligned apertures having sequential decreasing diameters along a length of a lower section of the hollow elongated cylindrical member which is inserted into a plant root zone. The hollow elongated cylindrical member of the invention being structured to receive at least one aqueous liquid from at least one aqueous liquid source.

13 Claims, 5 Drawing Sheets

(56) References Cited

U.S. PATENT DOCUMENTS

| | | |
|---|---|---|
| 6,241,163 B1 | 6/2001 | Bremer |
| 7,284,928 B2 | 10/2007 | Perez et al. |
| 8,132,362 B2 | 3/2012 | King |
| 8,413,373 B2 | 4/2013 | Vered |
| 8,746,767 B2 | 6/2014 | Mouch et al. |
| 2004/0244117 A1 | 12/2004 | Huang |
| 2007/0204509 A1 | 9/2007 | Lotero et al. |

* cited by examiner

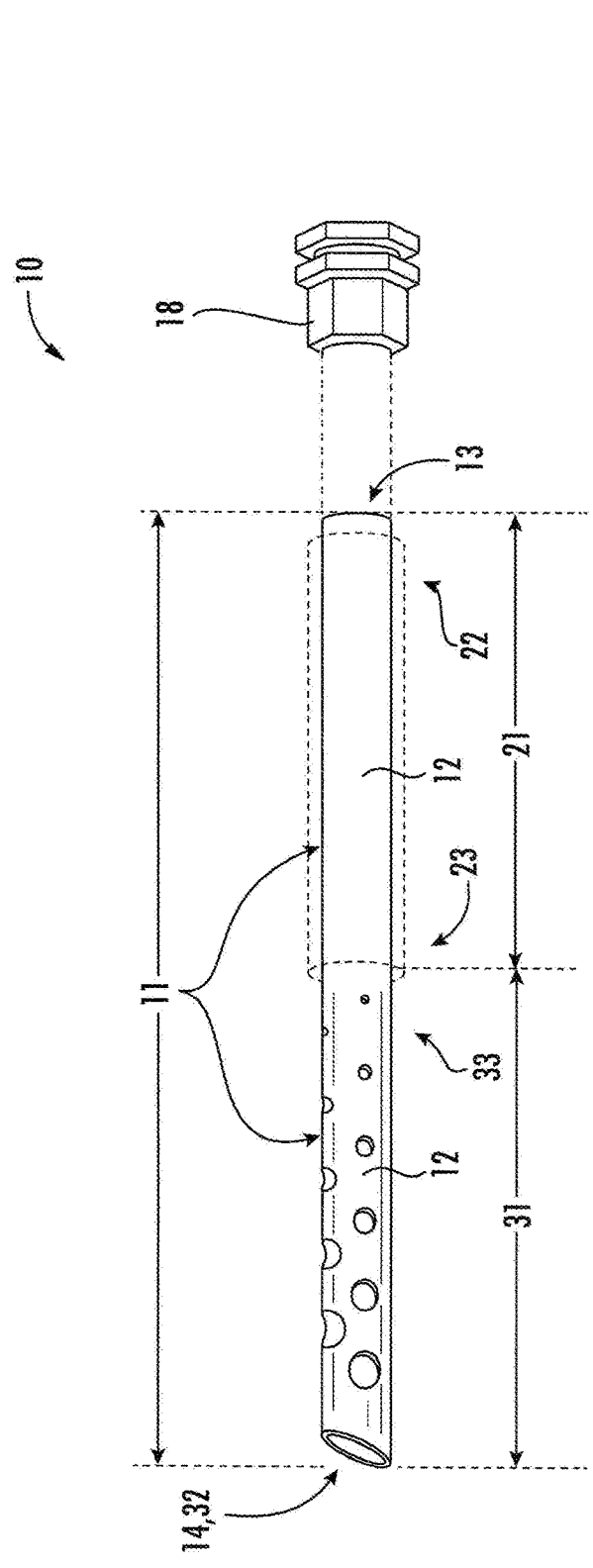
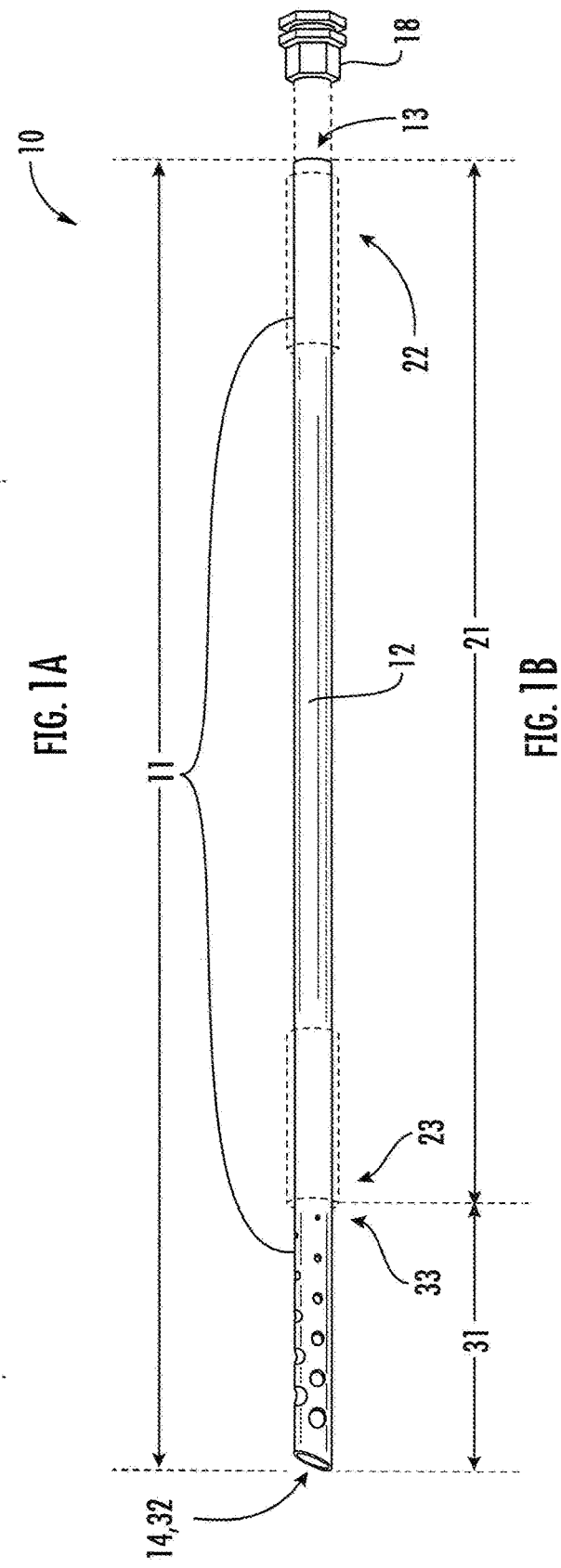
FIG. 1A
FIG. 1B

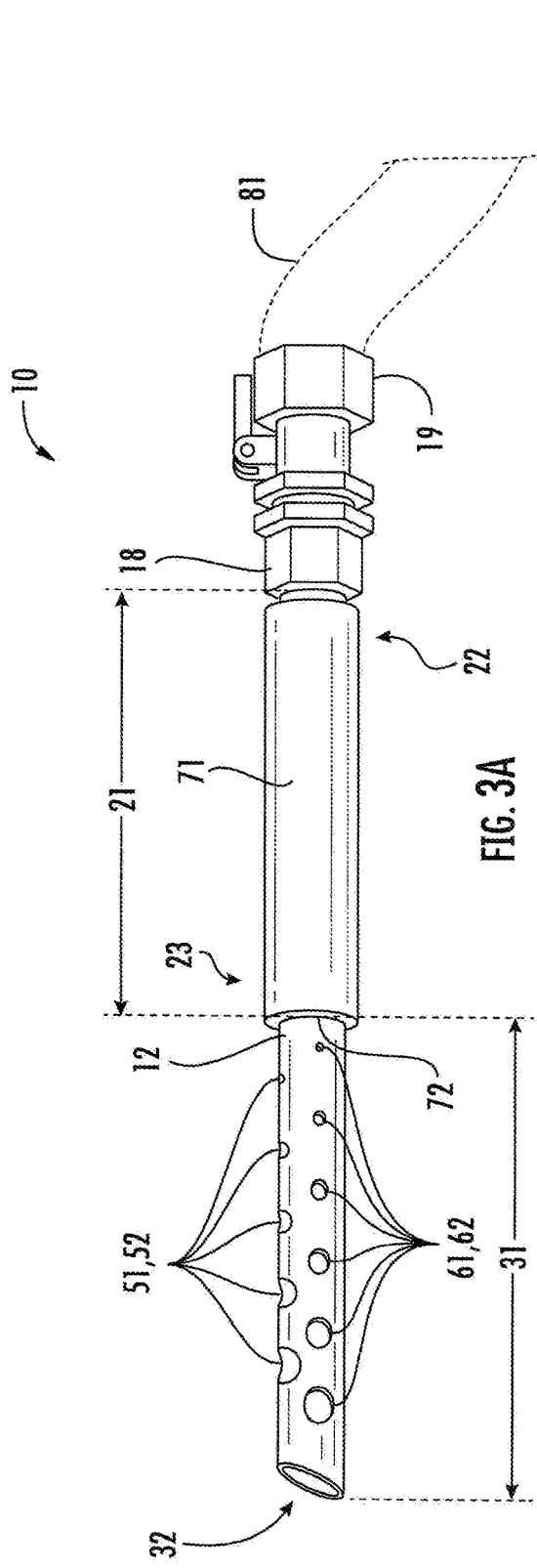
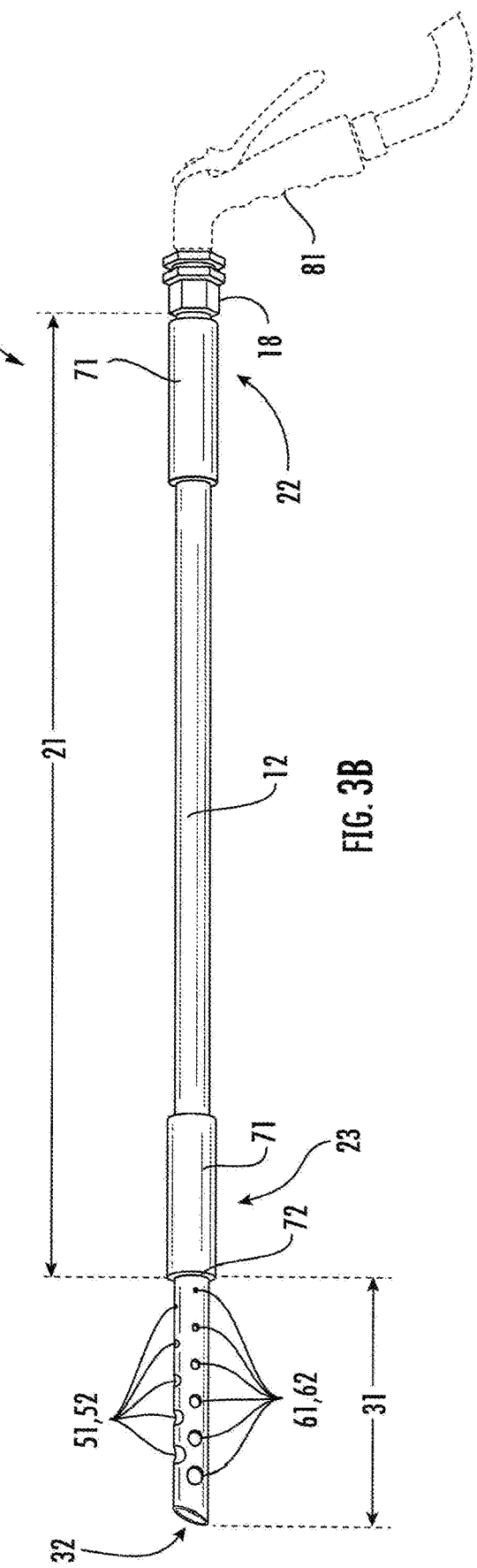
FIG. 3A
FIG. 3B

PLANT WATERING DEVICE

RELATED APPLICATIONS

This application is a continuation-in-part of U.S. patent application Ser. No. 15/896,056 filed Feb. 13, 2018, by the same inventor named herein and also claims priority to and incorporates by reference herein said application. Additionally, said U.S. patent application Ser. No. 15/896,056 filed Feb. 13, 2018, is a continuation of U.S. patent application Ser. No. 14/809,172 filed on Jul. 25, 2015, by the same inventor named herein and also claims priority to and incorporates by reference herein said application.

STATEMENT AS TO RIGHTS TO INVENTIONS MADE UNDER FEDERALLY SPONSORED RESEARCH AND DEVELOPMENT

Not Applicable.

PARTIES TO A JOINT RESEARCH AGREEMENT

Not Applicable.

SEQUENCE LISTING

Not Applicable.

FIELD OF THE INVENTION

The present invention generally relates to gardening tools. More specifically, the present invention relates to tools and devices that are used to water potted plants and in-ground garden plants.

BACKGROUND OF THE INVENTION

The home gardener experiences numerous limitations and inconveniences when it becomes necessary to provide water, or other aqueous liquids, to garden plants or to potted plants. Regardless of whether a gardener is using a simple watering can, or a complex and expensive dedicated irrigation system, there is always water run-off and waste when applying water, or other aqueous liquids, to the top of plants, or to the soil surrounding the plant. Additionally, the inability to apply water, or other aqueous liquids, directly to the root zone of a plant often results in the watering, and thus growth promotion, of unwanted plants such as weeds that happen to be in the proximity of the garden plant or potted plant. Monitoring the amount of water, or other aqueous liquids, applied to potted plants or to garden plants is also a challenge with many watering devices. The inability to properly monitor the amount of water, or other aqueous liquids, can result in plant disease or death when too much water, or not enough water, is provided to a potted plant or to a garden plant.

Additionally, devices that supply water, or such other aqueous liquids, from a pressurized source are generally limited to above ground applications. Such applications may result in the unwanted contact of the aqueous liquid with the plant foliage where such contact may be detrimental to the plant. Moreover, devices that attempt to provide water, or such other aqueous liquids, from a pressurized source often disrupt the soil surface and sub-surface soil integrity due to excessive pressure and water volume being dispersed near the soil surface or within the soil itself. Under these circumstances the plant may be exposed to an excessive volume of such aqueous liquid and thus kill the plant.

Moreover, devices that do provide water, or such other aqueous liquids, to a plant below the soil surface generally do so by passive means where the water merely seeps into the ground from the device reservoir in a random manner with no control over the volume nor the placement of the aqueous liquid dispersed.

Unlike the present invention, there are few single use tools available that are capable of effectively watering both potted plants and in-ground garden plants above and below the soil surface.

Accordingly, there remains room for improvement and variation within the art.

SUMMARY OF THE INVENTION

The present invention is directed to a device that can effectively apply water, or other aqueous liquids, to potted plants or to in-ground garden plants.

It is therefore at least one aspect of the present embodiments to provide watering device having a hollow elongated cylindrical member having a length from about 8 inches to about 48 inches being designed and structured to permit the flow of at least one aqueous liquid from at least one aqueous liquid source through the hollow elongated cylindrical to the root zone of a plant.

It is therefore at least one aspect of the present embodiments to provide a watering device having a hollow elongated cylindrical member with an open upper end and an open lower end, and at least one side wall connecting the open upper end to the open lower end such that the hollow elongated cylindrical member being structured to direct the flow of at least one aqueous liquid through the hollow elongated cylindrical member.

It is a further aspect of the present embodiments of the present invention to provide a hollow elongated cylindrical member having an upper section of a particular length with the upper section having an upper end and a lower end, with the upper end having a means for detachably engaging a source of at least one aqueous liquid.

It is at least one aspect of the present embodiments of the present invention to provide a hollow elongated cylindrical member having a lower section which has an upper end that abuts and extends from the lower end of the upper section of the hollow elongated cylindrical member and a beveled lower end.

It is still a further aspect of the present embodiments of the present invention to provide a lower section of the hollow elongated cylindrical member having a length which is insertable below a soil surface of a soil comprising a plant root zone.

It is at least one aspect of the present embodiments of the present invention to provide lower section of the hollow elongated cylindrical member in which the beveled lower end of the lower section is designed and structured to facilitate inserting the length of the lower section of the hollow elongated cylindrical member into a plant root zone.

It is at least one aspect of the present embodiments of the present invention to provide a plurality of linearly aligned apertures which pass through the side wall of the hollow elongated cylindrical member such that the apertures are evenly spaced along the length of the lower section of the hollow elongated cylindrical member.

It is at least one aspect of the present embodiments of the present invention to provide that the linearly aligned apertures permit the aqueous liquid from within said hollow elongated cylindrical member to flow into the plant root zone when the length of said lower section of the hollow elongated cylindrical member is inserted below the surface of the soil to a depth at which all of the apertures are below the soil surface.

It is at least one aspect of the present embodiments of the present invention to provide that the linearly aligned apertures exist as at least one series of apertures with sequentially decreasing diameters such that the aperture with the largest diameter being adjacent to the beveled lower end of the lower section of the hollow elongated cylindrical member and the aperture with the smallest diameter being the furthest from the beveled lower end.

It is at least one aspect of the present embodiments of the present invention to provide at least one resilient collar member of a certain length and thickness affixed to and encircling a certain length of the upper section of the hollow elongated cylindrical member.

It is at least one aspect of the present embodiments of the present invention to provide that the resilient collar member define a lower edge which abuts the length of the lower section of the hollow elongated cylindrical member, such that the lower edge is designed and structured to engage the soil surface to limit the depth at which the length of said lower section of the hollow elongated cylindrical member is inserted into the soil.

These and other features, aspects, and advantages of the present invention will become better understood with reference to the following description and appended claims.

BRIEF DESCRIPTION OF THE DRAWINGS

These and other features, aspects, and advantages of the present invention will become better understood with regard to the following description, appended claims, and accompanying drawings where:

FIG. 1A is a perspective view of a plant watering device illustrating a shorter length for one preferred embodiment of the present invention;

FIG. 1B is a perspective view of a plant watering device illustrating a longer length for one preferred embodiment of the present invention;

FIG. 3A is a perspective of a plant watering device in one configuration for watering plants;

FIG. 3B is a perspective of a plant watering device in one configuration for watering plants;

DETAILED DESCRIPTION OF THE INVENTION

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 2A:
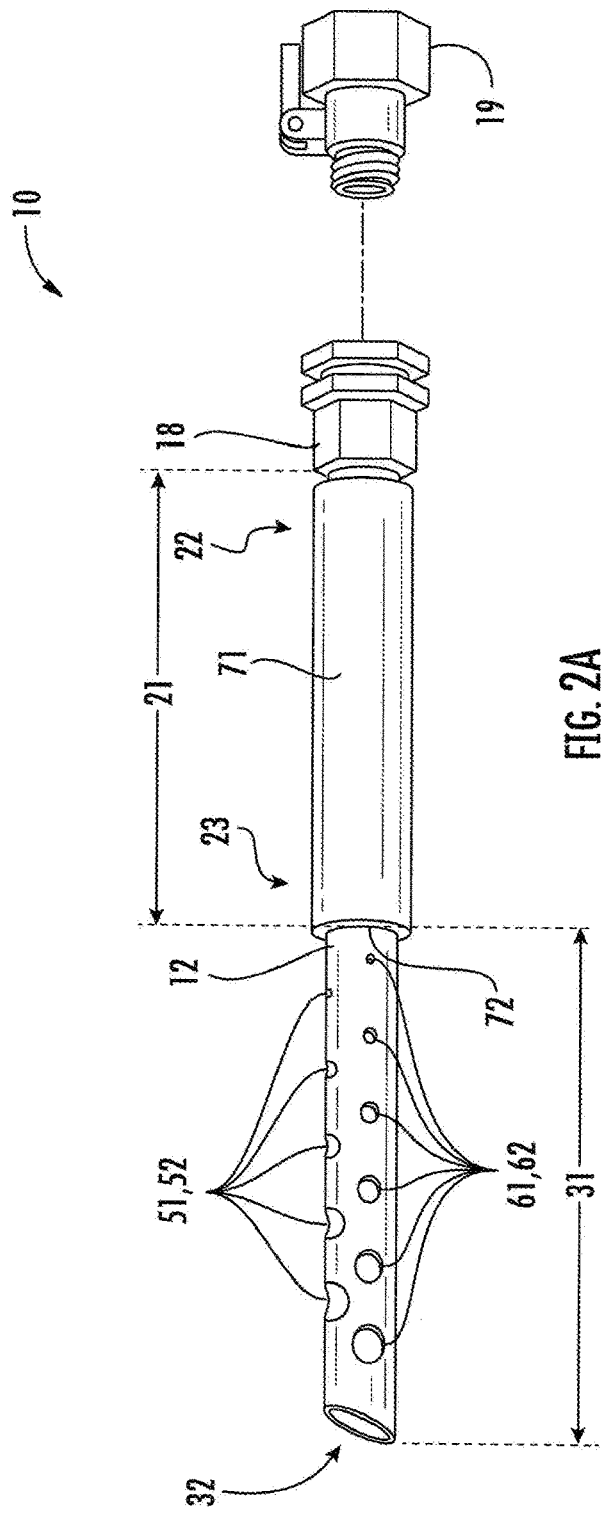
FIG. 2A is a perspective view of a plant watering device with a prospective ball valve attachment.
Figure 2B:
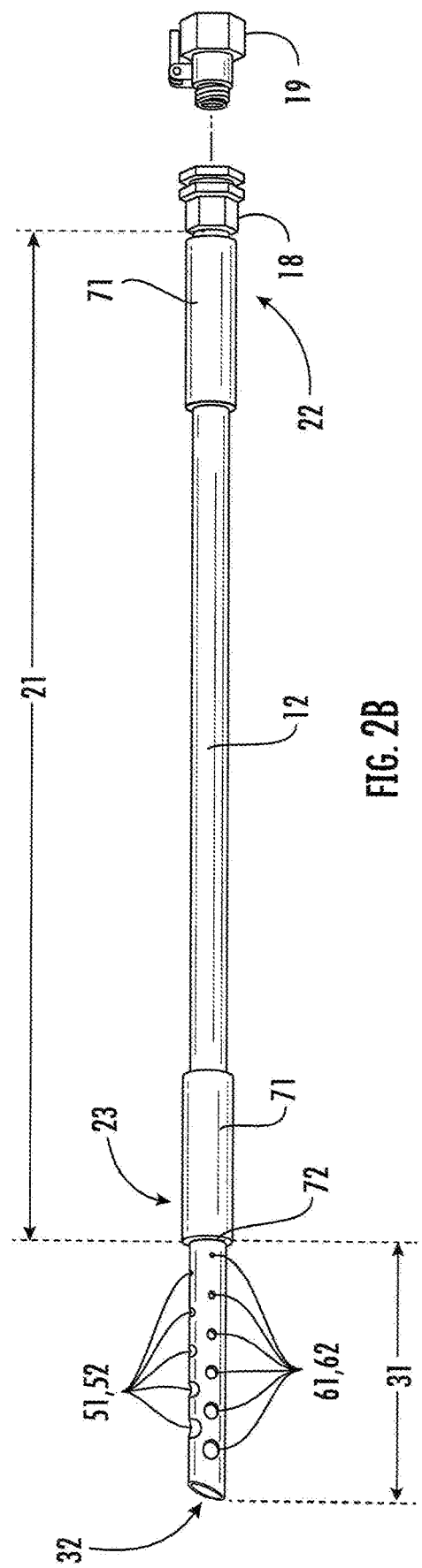
FIG. 2B is a perspective view of a plant watering device with a prospective ball valve attachment.
Figure 4:
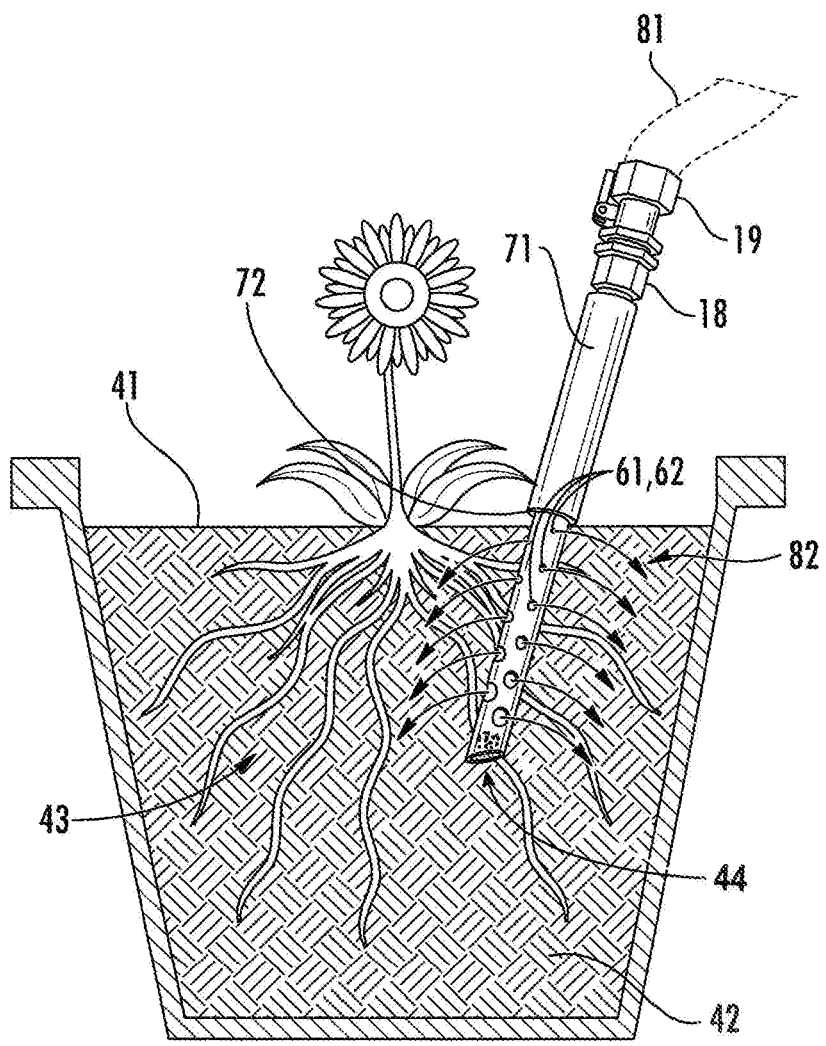
FIG. 4 is a cross sectional view illustrating the present invention watering the root zone of a potted plant.
Figure 5:
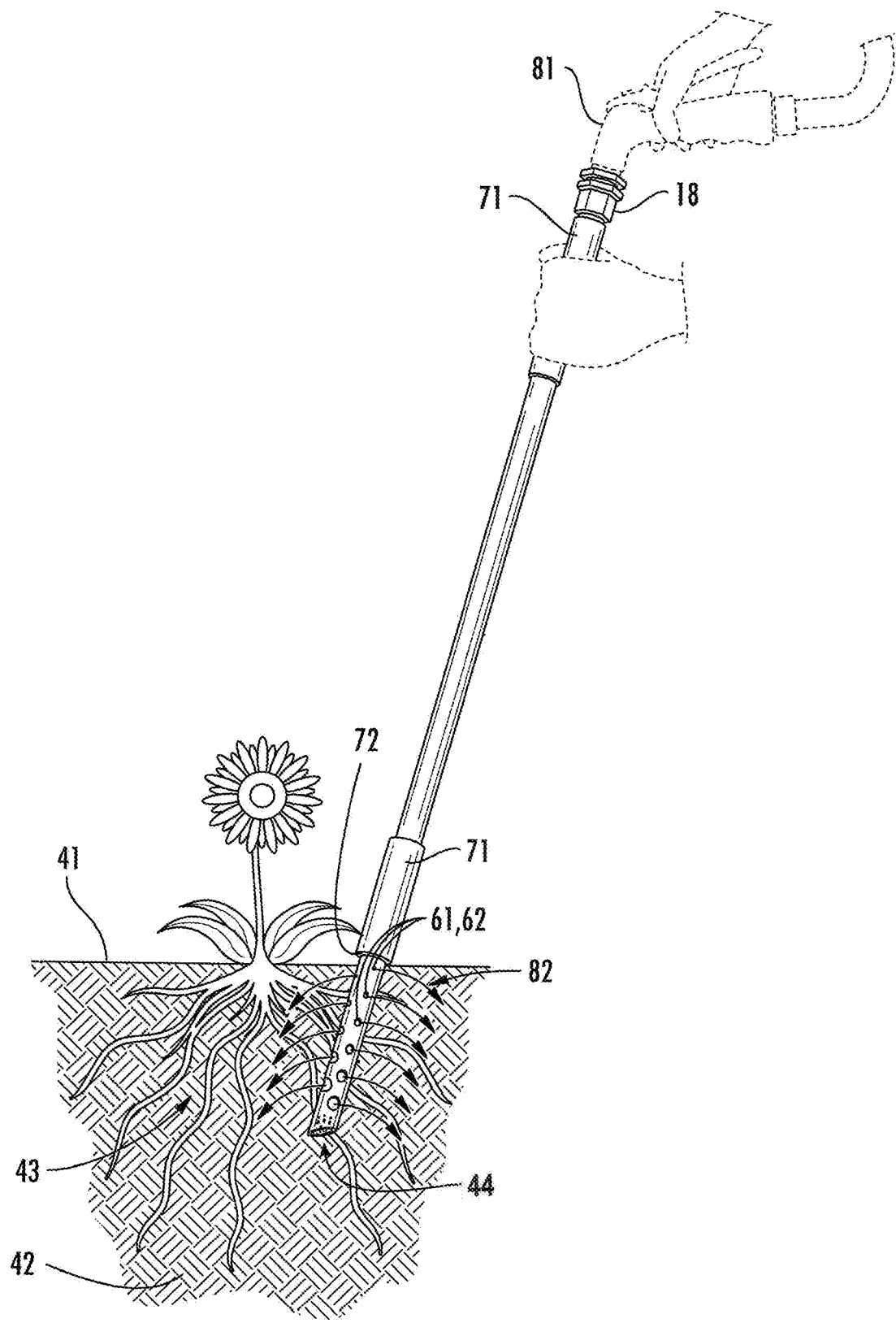
FIG. 5 is a cross sectional view illustrating the present invention watering the root zone of a garden plant.

As seen in reference to FIGS. 1A, 1B, 2A, 2B, 3A, 3B, 4 and 5, a device for watering plants 10 is provided. In accordance to the present invention, a plant watering device 10 comprising a hollow elongated cylindrical member 11 having a length from about 8 inches to about 48 inches and an open upper end 13, a beveled lower end 32, a plurality of linearly aligned apertures 51, 52, 61, 62, and at least one resilient collar member 71.

In one preferred embodiment of the present invention designed and adapted to water potted plants the hollow elongated cylindrical member 11 comprising a length from about 8 inches to about 16 inches, preferably about 16 inches. The present invention having a shorter hollow elongated cylindrical member provides a user greater control and flexibility for use with potted plants or such other areas with tight confines. In another preferred embodiment of the present invention designed and adapted to water in-ground garden plants the hollow elongated cylindrical member 11 comprising a length from about 36 inches to about 48 inches, preferably about 42 inches. The present invention having a longer hollow elongated cylindrical member provides a user the ability to supply water to in-ground garden plants from a convenient standing position. The longer hollow elongated cylindrical member also provides greater leverage when inserting the beveled lower end of the hollow elongated cylindrical member into a soil comprising at least one level of a plant root zone.

Another embodiment of the present invention includes the hollow elongated cylindrical member 11 manufactured from 16 gauge aluminum pipe and having an interior diameter of about ½ inch and an outside diameter of about ⅞ inch. It should be recognized that other embodiments of the present invention may include larger diameter tubing manufactured from aluminum, as well as other metals and plastics such a PVC, capable of providing the hollow elongated cylindrical member sufficient strength and rigidity to perform the tasks for which the present invention is directed.

Continuing to refer to FIGS. 1A, 1B, 2A, 28, 3A, 3B, 4, and 5, the hollow elongated cylindrical member 11 of the present invention is designed and structured to receive at least one volume of at least one aqueous liquid 42 from at least one positive pressure aqueous liquid source 81 into at least one level of a plant root zone 43. The hollow elongated cylindrical member 11 of the present invention includes an open upper end 13 and an open lower end 14, and at least one side wall 13 connecting the open upper end 13 to said open lower end 14. The hollow elongated cylindrical member 11 is comprised of an upper section 21 and a lower section 31. The hollow elongated cylindrical member 11 being designed and structured to direct a flow of the at least one volume of the at least one aqueous liquid 82 through its hollow interior to the intended plant or plant root zone 43, or to at least one level of a plant root zone 43.

The upper section 21 of the hollow elongated cylindrical member 11 includes an upper end 22 and a lower end 23. In a preferred embodiment of the present invention the upper end 22 of the upper section 21 of the hollow elongated cylindrical member 11 is configured and structured to include a means to detachably attach at least one positive pressure liquid source 81 for at least one aqueous liquid 82 (a positive pressure liquid source meaning any watering device which employs, or relies on, pressure to expel its aqueous liquid onto an object or area). This can be accomplished with the upper end 22 being adapted and structured to include a female threaded end or female coupling component 18. The female coupling component 18 can readily detachably attach said at least one source of aqueous liquid 81 having, a male threaded end such as a garden hose 81 or a pistol grip garden hose sprayer 81. In the event it is necessary to control the flow of the at least one aqueous liquid to and through the hollow elongated cylindrical member another preferred embodiment of the present invention may include a ball value 19 having a male threaded end structured to detachably attach said female coupling component 18 of the present invention and a female threaded end to detachably attach at least one positive pressure source of aqueous liquid having a male threaded end for detachable attachment. In another embodiment of the present invention the female coupling component may be designed and structured as a flanged upper end of the hollow elongated cylindrical member, the flanged upper end of the elongated cylindrical member including a threaded female connector being disposed within the flanged upper end to detachably attach said at least one positive pressure aqueous liquid source 81 having a male threaded end. One example of an alternative flow control device includes a pistol grip garden hose sprayer with a male threaded outlet capable of engaging the female connector means affixed to the upper end of the elongated cylindrical member. Additionally, as shown in specifically in FIG. 5, the configuration and structure of the pistol grip garden hose sprayer 81 when connected to the female coupling component can provide the user additional leverage when inserting the beveled lower end 32 of the elongated cylindrical member 11 into at least one level of a plant root zone 43.

In a preferred embodiment of the present invention, the at least one aqueous liquid 82 being water. However, other aqueous liquids may include aqueous fertilizer solutions or the like. In a preferred embodiment of the present invention as shown in FIGS. 3A, 3B, 4, and 5, the at least one positive pressure aqueous liquid source being a conventional garden hose 81 having the customary threaded male connection at its outlet end. Additionally, other aqueous liquid sources may include pistol grip garden hose sprayers 81 connected to a garden hose with the pistol grip garden hose sprayer having a threaded male outlet for connecting to threaded female connectors, or other such devices designed and structured to provide for the flow of aqueous liquids there through.

The lower section 31 of the hollow elongated cylindrical member 11 comprising a length of about 4 inches to about 8 inches, an upper end 33 abutting and extending from the lower end 23 of said upper section 21 of the hollow elongated cylindrical member 11, and a beveled lower end 32. In a preferred embodiment of the present invention the entire length of the lower section 31 of the hollow elongated cylindrical member 11 is designed and structured to be inserted below a soil surface 41 of a soil 42 comprising at least one level of a plant root zone 43, wherein said beveled lower end 32 of said lower section 31 of the hollow elongated cylindrical member 11 being designed and structured to facilitate inserting said length of said lower section 31 into said soil 42 comprising the at least one level of a plant root zone 43.

Now referring to FIGS. 2A, 2B, 3A, 3B, 4, and 5 a preferred embodiment of the present invention includes a plurality of linearly aligned apertures 51, 52, 61, 62 passing through and being defined by said side wall 12 of the hollow elongated cylindrical member 11. The plurality of linearly aligned apertures 51, 52, 61, 62 are evenly spaced along the length of the lower section 31 of the hollow elongated cylindrical member 11. In one preferred embodiment of the present invention said plurality of linearly aligned apertures being evenly spaced at one-inch intervals as measured from a center of each aperture. The linearly aligned apertures being designed and structured to permit the flow of the at least one aqueous liquid 82 from within said hollow elongated cylindrical member 11 into the at least one level of a plant root zone 43 of a potted plant or an in-ground garden plant when the length said lower section 31 of the hollow elongated cylindrical member 11 is inserted below the surface 41 of the soil 42 to a depth at which all of said plurality of linearly aligned apertures are below the soil surface 41. As said length said lower section 31 of the hollow elongated cylindrical member 11 is inserted below the surface 41 of the soil 42 into the at least one level of a plant root zone 43 a soil plug 44 is formed at the bevel lower end 32 of the lower section 31 of the hollow elongated cylindrical member 11 within the open lower end 14 of the hollow elongated cylindrical member. Once the flow of at least once one aqueous liquid 82 is directed into and within the hollow elongated cylindrical member 11 of the present invention the soil plug 44 obstruction within the open lower end of the hollow elongate cylindrical member 11 forces the flow of the at least one aqueous liquid 82 through the plurality aligned apertures 51, 52, 61, 62 into the at least one level of said plant root zone 43.

Continuing to refer to FIGS. 2A, 2B, 3A, 3B, 4, and 5, said plurality of linearly aligned apertures 51, 52, 61, 62 along said length of said lower section of the hollow elongated cylindrical member include at least one series of apertures having sequential decreasing diameters when progressing from the aperture having the largest diameter to the aperture having the smallest diameter. In a preferred embodiment of the present invention the aperture having the largest diameter being adjacent to said beveled lower end 32 of the lower section 31 of the hollow elongated cylindrical member 11 and the aperture having the smallest diameter being the furthest from the beveled lower end 32 of the lower section 31 of the hollow elongated cylindrical member 11. Since a smaller volume of the at least one aqueous liquid 82 is generally needed by a potted plant or an in-ground garden plant near the soil surface 41, smaller diameter apertures are appropriately positioned along said length of said lower section of the hollow elongated cylindrical member to reduce the volume of the at least one aqueous liquid dispersed just below the soil surface. Furthermore, since a greater volume of the at least one aqueous liquid 82 is needed by a potted plant or an in-ground garden plant at levels deeper within the at least one level of a plant root zone 43, larger diameter apertures are appropriately positioned near the beveled lower end 32 of the lower section 31 of the hollow elongated cylindrical member 11 to increase the volume of the at least one aqueous liquid dispersed into the deeper levels of the at least one level of a plant, root zone 43.

In a preferred embodiment of the present invention the plurality of linearly aligned apertures comprising first and second series of at least five apertures 51, 52 and third and fourth series of at least six apertures 61, 62 wherein each series of apertures having sequential decreasing diameters. The first series of at least five apertures 51 of the present invention having sequential decreasing diameters of ½ inch, ⁷⁄₁₆ inch, ⅜ inch, ⁹⁄₃₂ inch, and ¼ inch in linear alignment with said beveled lower end 32 of the lower section 31 of the hollow elongated cylindrical member 11. The ½ inch diameter aperture being adjacent to said beveled lower end 32 of the lower section 31 of the hollow elongated cylindrical member 11 and the ¼ inch diameter aperture being the furthest from said beveled lower end 32 of the lower section 31 of the hollow elongated cylindrical member 11. The second series of at least five apertures 52 of the present invention being an exact duplicate of the first series of at least five apertures and passing though said side wall 12 of the hollow elongated cylindrical member 11 opposite to said first series of at least five apertures 51.

Continuing to refer to FIGS. 2A, 2B, 3A, 3B, 4, and 5, the third series of at least six apertures 61 of the present invention having sequential decreasing, diameters of ½ inch, ⁷⁄₁₆ inch, ⅜ inch, ⁹⁄₃₂ inch, ¼ inch, and ⅛ inch positioned between and juxtaposed to said first and second series of at least five apertures 51, 52. The ½ inch diameter aperture being adjacent to said beveled lower end 32 of the lower section 31 of the hollow elongated cylindrical member 11 and said ⅛ inch diameter aperture being the furthest from said beveled lower end 32 of the lower section 31 of the hollow elongated cylindrical member 11. The fourth series of at least six apertures 62 being an exact duplicate of the third series of at least six apertures and passing though said side wall 12 of the hollow elongated cylindrical member 11 opposite to the third series of at least six apertures 61.

Now referring to FIGS. 2A, 2B, 3A, 3B, 4, and 5, a preferred embodiment of the present invention includes at least one resilient collar member 71 affixed to and encircling at least one portion of the upper section 21 of said hollow elongated cylindrical member 11. The at least, one resilient collar member 71 having a length of about six inches and a thickness of about ⅛ inches is designed and structured to fulfil several functions. The at least one resilient collar member 71 defining a lower edge 72 abutting said length of the lower section 31 of said hollow elongated cylindrical member 11. Said lower edge 72 is designed and structured to engage the soil surface 41 to limit the depth at which said length of the lower section 31 of said hollow elongated cylindrical member 11 is inserted into said soil 42. The lower edge 72 functions as both a visual depth indicator and a physical depth indicator to which the lower section 31 of said hollow elongated cylindrical member 11 must be inserted below the soil surface 41 such that all the linearly aligned apertures 51, 52, 61, 62 of the present invention are below the soil surface 41 and positioned within the at least one level of a plant root zone 43. The thickness of the at least one resilient collar member 71 together with the diameter of the hollow elongated cylindrical member 11 creates a greater diameter than just the diameter of the hollow elongated cylindrical member 11 and as such creates a resistance to continued insertion of the lower section 31 upon the lower edge 72 coming into contact with the soil surface 41.

Additionally, the resilient collar member 71 is designed and structured to function as a means for a user to securely grip and hold the present invention when inserting the length of the lower section 31 of the hollow elongated cylindrical member 11 below the soil surface into the at least one level of a plant root zone. Depending on the soil characteristics such moisture content, soil composition, and the like, more or less exertion and/or force may by required by a user to insert the present invention to the proper depth and thus necessitate a secure grip.

The resilient collar member 71 is also designed and structured to function as a means for removing the soil plug 44, or such other soil and debris, that is formed or otherwise accumulated during the use of the present invention. The soil plug 44, and/or such other soil and debris, is removed from within the open lower end 13 of said hollow elongated cylindrical member 11 by bumping or striking said at least one resilient member 71 against a stationary object to dislodge the soil plug and/or accumulated soil. The resilient collar member 71 protects the hollow elongated cylindrical member 11 from damage which may otherwise occur due to such bumping or striking against a stationary object.

In a preferred embodiment of the present invention the resilient collar member 71 is made of a durable synthetic rubber, such as neoprene, which is generally inexpensive and capable of providing a tactile surface for gripping and also for absorbing shock when dislodging the soil plug or other debris without incurring permanent deformation. Although the resilient collar member can be manufactured from natural rubber, natural rubber has limited compatibility with petroleum products.

The unique design of the present invention make its use both simple and effective when providing water, or such other aqueous solution, to either potted plants or in-ground garden plants, via a positive pressure watering device (i.e., any watering device which employs, or relies on, pressure to expel its aqueous solution onto an object or area). When using the present invention to water plants above ground level, as opposed the watering plants below the soil's surface, a user connects the male end of an aqueous liquid source to the female threaded coupling component incorporated into the open upper end of the hollow elongated cylindrical member of the present invention. In the event the aqueous liquid source does not have a means by which, the user can control the flow of the aqueous liquid to be applied to the plant, the user may desire to attach a ball valve to the female threaded coupling component of the present invention and then subsequently connect the male threaded end of the aqueous liquid source to the female threaded component of the ball valve. While the user is pointing the beveled lower end of the present invention towards a plant, or the area which the user desires to apply the aqueous liquid, the user initiates the flow of the aqueous liquid into and through the hollow elongated cylindrical member of the present invention. The columnar design and structure of the present invention permits the user to apply the aqueous liquid directly to the plant, or to the desired area around the plant, without the concern of wasteful over-spray, uncontrolled run-off, or potential detrimental contact to a plant due to composition of the aqueous solution as is experienced with other positive pressure plant watering devices.

The present invention is especially useful and effective when used for providing water, or such other aqueous liquids, directly to the root zone of a plant. A user connects the present invention to an aqueous liquid source in the same manner as described above for use when applying water, or such other aqueous liquid, to plants above ground. Once the present invention is connected to an aqueous liquid source comprising the desired aqueous liquid, the beveled lower end on the lower section of the hollow elongated cylindrical member is pushed into the soil at the base of the plant comprising the at least one level of a plant root zone to which the aqueous solution will be applied. The lower section of the hollow elongated cylindrical member is pushed into the soil until the soil surface comes into contact with the lower edge of the resilient collar member. The contact of the soil surface with the lower edge of the resilient collar member serves as both a visual and a physical que that all the linearly apertures located on the lower section of the hollow elongated cylindrical member are appropriately positioned below the soil surface and generally within the at least one level of a plant root zone.

An important aspect of the present invention is the soil plug that is formed within the open lower end of the hollow elongated cylindrical member as the beveled lower end of the present invention is pushed into the soil. Once the lower section of the hollow elongated cylindrical member is inserted to its proper depth below the soil surface, the user initiates the flow of the aqueous solution into the hollow elongated cylindrical member of the present invention. As the aqueous solution proceeds to the lower section of the hollow elongated cylindrical member, the soil plug blocks the exit of the aqueous liquid via the lower open end of the hollow elongated cylindrical member, and as such the aqueous liquid exists the hollow elongated cylindrical member via the linearly aligned apertures located on the lower section of the hollow elongated cylindrical member. The smaller diameter apertures being nearer to the soil surface allows smaller volumes of the aqueous liquid to be dispersed at the upper levels of the root zone where it is less critical to a plant's well-being. The larger diameter apertures being closer to the beveled lower end of the hollow elongated cylindrical member and consequently at greater depth from the soil surface allow greater volumes of the aqueous liquid to be dispersed deeper into the at least one level of a plant root, zone where it is most beneficial to the plant.

Depending on such factors as soil condition and plant type the user may increase or decrease the flow rate at which the aqueous solution enters the hollow elongated cylindrical member via flow controls available on the aqueous liquid source or the attachment of a ball valve to the female coupling component at the upper open end of the hollow elongated cylindrical member of the present invention. The ability to adjust the flow rate of the aqueous liquid into and out of the present invention maximizes the effectiveness of supplying the aqueous liquid directly to the at least one level of a plant root zone, and also prevents disruption of the soil below the soil surface as well as at the soil surface due to excessive flow of the aqueous liquid. On removal of the hollow elongated cylindrical member, the channel like hole that remains in the soil can provide beneficial aeration to the soil.

The above method for using the present invention applies to both potted plants and in-ground garden plants. The embodiments of the present invention acknowledge the usefulness of a hollow elongated cylindrical member having a shorter upper section to be used with potted plants and a hollow elongated cylindrical member having a longer upper section to be used with in-ground garden plants.

The present invention provides a number of benefits and attributes for users of garden devices for the watering of plants. The very essence of the present invention is its ability to replace effectively replace to traditional watering can historically used to water plants of shapes and sizes in plant pots and in the ground.

One beneficial feature of the present invention is a user's ability to direct a proportional amount of an aqueous liquid, most, commonly water, below the soil surface directly to a at least one level of a plant root zone without over-watering the plant or producing wasteful water run-off. This attribute is accomplished by having apertures of different diameters for the dispersion of the aqueous liquids strategically placed on the elongated cylindrical member of the present invention. The specific placement of smaller diameter apertures on the elongated cylindrical member of the present invention provides for a small volume of aqueous liquid to be dispersed just below the soil surface. Similarly, the placement of the larger diameter apertures at the lower end of the elongated cylindrical member of the present invention provides for a larger volume of aqueous liquids to be dispersed at or now the at least one level of a plant root zone.

The ability to adjust the flow rate of the aqueous liquid into and out of the present invention maximizes the effectiveness of supplying the aqueous liquid directly to the at least one level of a plant root zone, and also prevents disruption of the soil below the soil surface as well as at the soil surface due to excessive flow of the aqueous liquid.

Additionally, the design and structure of the present invention allows a user to accurately apply an aqueous liquid above or below the soil surface. This proper placement of an aqueous liquid helps to prevent of watering of unwanted weeds and other undesirable plants. Also, the cylindrical void that remains once the elongated cylindrical member of the present invention is withdrawn from the soil is a simple means to provide limited aeration to the soil and to a plant's root zone.

The simply design of the present invention insure that it can be used with ease and be economically manufactured.

Although preferred embodiments of the invention have been described using specific terms, devices, and methods, such description if for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained herein.

That which is claimed:

1. A plant watering device comprising:
   a hollow elongated cylindrical member having an open upper end and an open lower end, at least one side wall connecting said open upper end to said open lower end and being designed and structured to direct a flow of at least one aqueous liquid there through, said hollow elongated cylindrical member further characterized by
   an upper section having a length, said upper section having an upper end and a lower end, said upper end having a means for detachably engaging a source of said at least one aqueous liquid, and
   a lower section having an upper end abutting and extending from said lower end of said upper section of the hollow elongated cylindrical member and a beveled lower end, said lower section having a length insertable below a soil surface of a soil comprising at least one level of a plant root zone, wherein said beveled lower end of said lower section of the hollow elongated cylindrical member being designed and structured to facilitate inserting said length of said lower section of the hollow elongated cylindrical member into said soil comprising said at least one level of a plant root zone;

a plurality of linearly aligned apertures passing through said side wall of the hollow elongated cylindrical member being evenly spaced along said length of said lower section of the hollow elongated cylindrical member and designed and structured to permit the flow of said at least one aqueous liquid from within said hollow elongated cylindrical member into said at least one level of a plant root zone when said length of said lower section of the hollow elongated cylindrical member is inserted below the surface of the soil to a depth at which all of said plurality of linearly aligned apertures are below the soil surface, said plurality of linearly aligned apertures comprising at least one series of apertures having sequential decreasing diameters, wherein said aperture having the largest diameter being adjacent to said beveled lower end of said lower section of said hollow elongated cylindrical member and said aperture having the smallest diameter being the furthest from said beveled lower end of said lower section of said hollow elongated cylindrical member;

at least one resilient collar member having a length and thickness being affixed to and encircling at least one length of said upper section of said hollow elongated cylindrical member, said at least one resilient collar member defining a lower edge abutting said length of said lower section of said hollow elongated cylindrical member, said lower edge designed and structured to engage said soil surface to limit the depth at which said length of said lower section of said hollow elongated cylindrical member is inserted into said soil.

2. The plant watering, device of claim 1, wherein said at least, one aqueous liquid source is subject to a positive pressure directing the flow of said at least one aqueous liquid into said hollow elongated cylindrical member.

3. The plant watering device of claim 1, wherein said plant root zone comprising a plurality of levels below said soil surface.

4. The plant watering device of claim 1, w herein said length of said lower section of said hollow elongated cylindrical member is substantially 8 inches.

5. The plant watering device of claim 1, w herein said length of said upper section of said hollow elongated cylindrical member is from substantially 8 inches to substantially out 40 inches.

6. The plant watering device of claim 1, w herein said hollow elongated cylindrical member is substantially 42 inches in length.

7. The plant watering device according to claim 1 and characterized further by the at least one series of apertures having sequential decreasing diameters, wherein said diameters comprising ½ inch, ⁷⁄₁₆ inch, ⅜ inch, ⁹⁄₃₂ inch, and ¼ inch.

8. The plant watering device according to claim 1 and characterized further by the at least one series of apertures having sequential decreasing diameters, wherein said diameters comprising ½ inch, ⁷⁄₁₆ inch, ⅜ inch, ⁹⁄₃₂ inch, ¼ inch, and ⅛ inch.

9. A plant watering device comprising:

a hollow elongated cylindrical member designed and structured to receive at least one volume of at least one aqueous liquid from at least one positive pressure aqueous liquid source into at least one level of a plant root zone, the hollow elongated cylindrical member having an open upper end and an open lower end, at least one side wall connecting said open upper end to said open lower end and being designed and structured to direct a flow of the at least one volume of the at least one aqueous liquid through said hollow elongated cylindrical member, said hollow elongated cylindrical member further characterized by an upper section having a length, said upper section having an upper end and a lower end, said upper end having a means for detachably engaging said at least one positive pressure aqueous liquid source of said at least one aqueous liquid, and a lower section having an upper end abutting and extending from said lower end of said upper section of the hollow elongated cylindrical member and a beveled lower end, said lower section having a length insertable below a soil surface of a soil comprising said at least one level of a plant root zone, wherein said beveled lower end of said lower section of the hollow elongated cylindrical member being designed and structured to facilitate inserting said length of said lower section of the hollow elongated cylindrical member into said soil comprising said at least one level of a plant root zone and the formation of a soil plug within the open lower end of the hollow elongated cylindrical member said soil plug obstructing said flow of the at least one aqueous liquid from said open lower end of the hollow elongated cylindrical member upon the insertion of said length of said lower section of the hollow elongated cylindrical member into the at least one level of a plant root zone;

a plurality of linearly aligned apertures passing through said side wall of said hollow elongated cylindrical member being evenly spaced along said length of said lower section of said hollow elongated cylindrical member and designed and structured to permit the flow of said at least one volume of said at least one aqueous liquid from within said hollow elongated cylindrical member into the at least one level of said plant root zone when said length of said lower section of said hollow elongated cylindrical member is inserted below the surface of the soil to a depth at which all of said linearly aligned apertures are below the soil surface, said plurality of linearly aligned apertures comprising a first series of at least (5) apertures having sequential decreasing diameters of ½ inch, ⁷⁄₁₆ inch, ⅜ inch, ⁹⁄₃₂ inch, and ¼ inch in linear alignment with said beveled lower end of said lower section of said hollow elongated cylindrical member, said ½ inch diameter aperture being adjacent to said beveled lower end of said lower section of said hollow elongated cylindrical member and said ¼ inch diameter aperture being the furthest from said beveled lower end of said lower section of said hollow elongated cylindrical member, wherein smaller diameter apertures pelt tilting smaller volumes of the at least one aqueous liquid into the at least one level of a plant root zone levels nearer the soil surface and the larger diameter apertures permitting greater volumes of the at least one aqueous liquid into the plant root zone levels furthest from the soil surface, a second series of at least (5) apertures being an exact duplicate of said first series of at least (5) apertures and passing though said side wall of hollow elongated cylindrical member opposite to said first series of at least (5) apertures, a third series of at least (6) apertures having sequential decreasing diameters (of ½ inch, ⁷⁄₁₆ inch, ⅜ inch, 9/32 inch, 1/4 inch, and 1/8 inch) positioned between and juxtaposed to said first and second series of at least (5) apertures, said 1/2 inch diameter aperture being adjacent to said beveled lower end of said lower section of said hollow elongated cylindrical member and said 1/8 inch diameter aperture being the furthest from said beveled lower end of said lower section of said hollow elongated cylindrical member, wherein smaller diameter apertures permitting smaller volumes of the at least one aqueous liquid into the plant root zone levels nearer the soil surface and the larger diameter apertures permitting greater volumes of the at least one aqueous liquid into the plant root zone levels furthest from the soil surface, and a fourth series of at least (6) apertures being an exact duplicate of said third series of at least (6) apertures and passing though said side wall of said hollow elongated cylindrical member opposite to said third series of at least (6) apertures;

at least one resilient collar member having a length and thickness and being affixed to and encircling at least one length of said upper section of said hollow elongated cylindrical member, said at least one resilient collar member providing a means for indicating the depth to which said length of said lower section of the hollow elongated cylindrical member is inserted into the soil for supplying at least one aqueous liquid into the at least one level of a plant root zone, wherein said at least one resilient collar member defining a lower edge adjacent to and abutting said length of said lower section of said hollow elongated cylindrical member, said lower edge designed and structured to engage said soil surface to limit the depth at which said length of said lower section of said hollow elongated cylindrical member is inserted into said soil such that said plurality of linearly aligned apertures are beneath said soil surface, a means for gripping said hollow elongated cylindrical member when inserting said length of said lower section of said hollow elongated cylindrical member below the soil surface into the at least one level of a plant root zone, and a means for removing a soil accumulated within said lower section of said hollow elongated cylindrical member by bumping or striking said at lease one resilient member against a stationary object to dislodge said accumulated soil.

10. The plant watering device of claim 7, w herein said length of said upper section of said hollow elongated cylindrical member is from substantially 8 inches to substantially 40 inches.

11. The plant watering device of claim 8, w herein said length of said upper section of said hollow elongated cylindrical member is substantially 8 inches.

12. The plant watering device of claim 8, w herein said length of said upper section of said hollow elongated cylindrical member is substantially 34 inches.

13. The plant watering device of claim 7, w herein said length of said lower section of said hollow elongated cylindrical member is substantially 8 inches.

* * * * *